United States Patent
Roduner et al.

(10) Patent No.: US 12,449,463 B2
(45) Date of Patent: Oct. 21, 2025

(54) LOCOMOTIVE ENGINE INJECTION HARNESS TESTER

(71) Applicant: BNSF Railway Company, Fort Worth, TX (US)

(72) Inventors: Dustin Roduner, Topeka, KS (US); Roger L. Jackson, III, Tecumseh, KS (US)

(73) Assignee: BNSF Railway Company, Fort Worth, TX (US)

( * ) Notice: Subject to any disclaimer, the term of this patent is extended or adjusted under 35 U.S.C. 154(b) by 70 days.

(21) Appl. No.: 17/818,655

(22) Filed: Aug. 9, 2022

(65) Prior Publication Data

US 2024/0053395 A1    Feb. 15, 2024

(51) Int. Cl.
*G01R 31/00*      (2006.01)
*G01R 19/165*     (2006.01)
*G01R 31/54*      (2020.01)

(52) U.S. Cl.
CPC ..... *G01R 31/006* (2013.01); *G01R 19/16576* (2013.01); *G01R 31/54* (2020.01)

(58) Field of Classification Search
CPC . G01R 31/006; G01R 19/16576; G01R 31/54
See application file for complete search history.

(56) References Cited

U.S. PATENT DOCUMENTS

| | | | | |
|---|---|---|---|---|
| 4,220,912 A | * | 9/1980 | Williams | G01R 31/006 324/503 |
| 4,244,050 A | * | 1/1981 | Weber | H02H 3/24 714/24 |

(Continued)

FOREIGN PATENT DOCUMENTS

| | | | | |
|---|---|---|---|---|
| CN | 103954839 A | | 7/2014 | |
| EP | 0238738 A1 | | 9/1987 | |
| GB | 2360396 A | * | 9/2001 | .......... H01M 2/1016 |

OTHER PUBLICATIONS

Fariha Zahid, Simple Continuity Tester, Jul. 12, 2020, available at https://www.circuits-diy.com/simple-continuity-tester-circuit/ (Year: 2020).*

(Continued)

*Primary Examiner* — Daniel R Miller
(74) *Attorney, Agent, or Firm* — Whitaker Chalk Swindle & Schwartz PLLC; Enrique Sanchez, Jr.; Bradley J. Birchfield

(57) ABSTRACT

Methods, systems, and devices for determining the integrity of an engine harness are provided. In embodiments, an engine harness tester may include a power source providing an input voltage, a voltage regulator configured to convert an input voltage to an operating voltage, which may be applied to individual circuits that include segments of the engine harness routed through corresponding injectors, and a display for displaying the condition of each segment of the engine harness. In embodiments, the condition of a respective segment may include the condition of the electrical continuity of the individual circuit including the respective individual segment. The display of the engine harness tester may include a plurality of status indicators, each status indicator configured to display the condition of a respective individual segment of the engine harness.

17 Claims, 7 Drawing Sheets

(56) References Cited

U.S. PATENT DOCUMENTS

| | | | |
|---|---|---|---|
| 4,542,335 A * | 9/1985 | Williams | G01R 31/006 |
| | | | 324/66 |
| 4,764,727 A | 8/1988 | McConchie, Sr. et al. | |
| 4,945,760 A | 8/1990 | Hornung | |
| 5,107,426 A | 4/1992 | McGinty et al. | |
| 5,107,701 A | 4/1992 | Smith | |
| 5,168,238 A | 12/1992 | Larance | |
| 5,268,635 A * | 12/1993 | Bortolini | G01R 31/2818 |
| | | | 324/96 |
| 5,416,421 A * | 5/1995 | Doland, Sr. | G01R 31/44 |
| | | | 324/504 |
| 5,446,389 A | 8/1995 | Lenz | |
| 6,777,950 B2 | 8/2004 | Grado et al. | |
| 7,538,557 B2 | 5/2009 | DeHaven | |
| 9,069,026 B1 * | 6/2015 | Rutkowsky | G01R 31/44 |
| 2003/0038637 A1 * | 2/2003 | Bertness | H02J 7/00047 |
| | | | 324/426 |
| 2008/0306470 A1 * | 12/2008 | Friedman | A61B 1/0607 |
| | | | 606/3 |
| 2019/0146022 A1 | 5/2019 | Kinsella | |

OTHER PUBLICATIONS

Fuel Injector Test Light, disclosed Anonymously, IP.com No. IPCOM000246318D, May 27, 2016 (Year: 2016).*

Milwaukee Battery Adapters, available at https://powertoolsadapters.com/collections/milwaukee-battery-adapter on Jun. 28, 2022 (Year: 2022).*

Hunter, Kent Moore Fuel Injector Harness Load Tester J-34730-380, Dec. 16, 2021.

N/A, Portable High Voltage Wire Harness Test Systems, Dec. 16, 2021.

* cited by examiner

LOCOMOTIVE ENGINE INJECTION HARNESS TESTER

TECHNICAL FIELD

The present invention relates generally to electronic testing devices, and more particularly to a device for testing locomotive injection harnesses.

BACKGROUND OF THE INVENTION

There is no question that machinery has made our lives easier. Machines perform many tasks that are difficult or impossible for humans to perform. Engines are especially useful machines that allow us to move large amounts of materials, objects, and/or persons. For example, locomotive engines allow us to move train cars that may carry various types of cargo over long distances. These locomotive engines, like every other type of engine, require regular maintenance to keep them in good working order. For example, locomotive engines are overhauled after certain periods of service to fix any problems present and to ensure they are in good condition. During overhaul, a locomotive engine may be taken apart and rebuilt. Some parts of the engine may be replaced after a certain time in service, and some parts of the locomotive engine may be inspected to determine whether these parts are in good condition or defective. Some parts, although not having failed yet, may not be within acceptable specifications, which may mean that these parts are close to failing. Inspecting these parts to determine their condition is essential to prevent a failure of the engine down the line. Parts of the engine that are found to be defective or outside of acceptable specifications parts may be replaced.

However, currently, testing the integrity of the wiring harness of a locomotive engine may not be available or may be prohibitively difficult. In some case, the engine harness is typically replaced regardless of the integrity of the engine harness. In these cases, the engine harness may be replaced whether the engine harness is defective or not. In some cases, the engine harness may not be replaced and may instead be reinstalled once the engine is rebuilt. Either case, however, creates problems. For example, replacing the engine harness when the engine harness is still in good working condition results in unnecessary costs.

On the other hand, reinstalling an engine harness whose condition is not known may mean reinstalling a defective engine harness, which may result in a failure later on. This subsequent failure can create significant problems as, typically, an engine may be first reassembled as part of the overhaul before being tested. Therefore, if a defective engine harness has been reinstalled, the problems may not be found until after the engine has been fully reassembled and the engine tested. Troubleshooting the failure may require disassembling the engine again, which may add significant expenses (e.g., in time and costs) to the overhaul. In some cases, the problems may not present themselves soon after the overhaul but may instead occur after the engine has been put back into service and may result in catastrophic failure, damaging other components and creating even bigger problems.

Furthermore, overhauling of a locomotive engine is generally performed by machinists or mechanics who typically lack in-depth expertise in electronic/electrical systems. Therefore, when troubleshooting problems arising from a defective engine harness, the machinists or mechanics may not be able to easily determine the root of the problem (e.g., may not be able to determine that the cause of the failure is a defective engine harness) and may instead replace, unnecessarily, other engine components (e.g., injectors, power distributors, etc.). Even when the machinists or mechanics are able to determine that the problem arises from a defective engine harness, the entire engine harness is replaced, as there is no way to determine which section or segment of the engine harness has failed. For example, an engine harness may include several segments, each of which may be configured to route an electrical pulse to a respective injector of the locomotive engine. Currently, there is no way to determine which of the several segments of the engine harness may be defective, save for a manual inspecting each segment individually. However, the engine harness is typically formed by wrapping the various segments into a single cable, and manually inspecting each segment of the engine harness may entail having to unwrap and unspool the harness, which essentially means taking the engine harness apart. This manual approach, as will be appreciated, is extremely time-consuming and requires expertise that may be beyond the person performing the overhaul.

BRIEF SUMMARY OF THE INVENTION

The present disclosure achieves technical advantages as systems, methods, and devices that provide functionality for determining the integrity of an engine wiring harness, also referred to herein as an engine harness. As used herein, determining the integrity of an engine harness may also be referred to as testing the engine harness. An engine harness may include a plurality of individual segments, where each individual segment may be configured to route an electrical pulse to a respective injector of the engine. In particular embodiments, an engine harness tester implemented in accordance with the present disclosure may be configured to test the integrity of the engine harness and may be able to determine the condition of each individual segment of the engine harness. The engine harness tester of embodiments may include a power source providing an input voltage to the engine harness tester, a voltage regulator configured to convert an input voltage to an operating voltage, which may be applied to individual circuits that include the individual segments of the engine harness, and a display including a plurality of status indicators for displaying a condition of each individual segment of the harness based on the application of the operating voltage to the individual circuits corresponding to the individual segments.

In embodiments, the engine harness tester may include a housing configured to encase circuitry of the engine harness tester. The housing may include a battery holder keyed to an external battery that may be used as a power source. In this manner, the engine harness tester of embodiments may be a compact and/or portable device. In some embodiments, the housing may include a mechanism for releasably engaging the body (e.g., a surface) of the locomotive engine in order to releasably attach the engine harness tester to the engine for user convenience. The mechanism for releasably attaching the engine harness tester to the body of the engine may include magnets, adhesive, a fastener, a hook, etc.

In embodiments, the engine harness tester may be configured as an easy-to-use device. For example, the engine harness tester of embodiments may include a single switch for activating the engine harness and for initiating the engine harness test. The display of the engine harness tester of embodiments may include a plurality of status indicators. Each status indicator of the plurality of status indicators may be configured to display a condition of a respective individual segment of the engine harness. In this manner, the engine harness tester of embodiments may be easy-to-use, as a user may operate the engine harness tester to determine the condition of each individual segment of the engine harness being tested by simply activating the switch and reading the status indicator that corresponds to each individual segment to identify the condition of each individual segment.

It is an object of the invention to provide a device for determining the integrity of an engine wiring harness. It is a further object of the invention to provide a method of determining the integrity of an engine wiring harness. These and other objects are provided by the present disclosure, including at least the following embodiments.

In one particular embodiment, an engine harness tester for testing the integrity of an engine harness of an engine is provided. The engine harness tester comprises an external power source configured to provide an input voltage, and a housing configured to enclose control circuitry. The control circuitry includes a voltage regulator configured to convert the input voltage from the external power source to a regulated operating voltage, and output the regulated operating voltage between a first terminal and a second terminal of the voltage regulator. The control circuitry also includes a connector adapter configured to route the regulated operating voltage from the first terminal of the voltage regulator through the engine harness, the engine harness including a plurality of individual segments, and to electrically couple each segment of the plurality of individual segments of the engine harness to a first terminal of a corresponding status indicator of a plurality of status indicators. The control circuitry also includes a display including the plurality of status indicators, each status indicator of the plurality of status indicators configured to display a condition of the corresponding individual segment of the plurality of individual segments of the engine harness. In embodiments, a second terminal of each status indicator of the plurality of status indicators is connected to the second terminal of the voltage regulator such that each status indicator of the plurality of status indicators is part of a corresponding individual circuit including the corresponding status indicator, the corresponding individual segment, and the voltage regulator.

In another embodiment, a method of testing the integrity of an engine harness of an engine is provided. The method includes applying an operating voltage through the engine harness to each electrical component of a plurality of electrical components of the engine. In embodiments, the engine harness includes a plurality of individual segments. The method also includes forming a plurality of individual circuits, each individual circuit of the plurality of individual circuits including an individual segment of the plurality of individual segment, an electrical component of the plurality of electrical components corresponding to the individual segment, and a status indicator, of a plurality of status indicators, corresponding to the individual segment, and displaying, on the plurality of status indicators, a condition of each individual segment of the plurality of individual segments on a status indicator corresponding to each individual segment, the condition of the individual segment based on a condition of an electrical continuity of an individual circuit corresponding to the individual segment of the plurality of individual segments of the engine harness.

In yet another embodiment, a device for testing the integrity of an engine harness of an engine is provided. The device comprises an external power source configured to provide an input voltage and a low a low voltage cutout configured to pass through the input voltage to a voltage regulator when the input voltage is equal to or above the predetermined threshold and to disconnect the external power source from the voltage regulator when the input voltage is below the predetermined threshold. The device also includes a voltage regulator configured to convert the input voltage to a regulated operating voltage and to output the regulated operating voltage between a first terminal and a second terminal of the voltage regulator. The device further includes a connector adapter configured to route the regulated operating voltage from the first terminal of the voltage regulator through the engine harness, the engine harness including a plurality of individual segments, and to electrically couple each segment of the plurality of individual segments of the engine harness to a first terminal of a corresponding status indicator of a plurality of status indicators. The device also includes a display including the plurality of status indicators, each status indicator of the plurality of status indicators configured to display a condition of the corresponding individual segment of the plurality of individual segments of the engine harness. In embodiments, a second terminal of each status indicator of the plurality of status indicators is connected to the second terminal of the voltage regulator such that each status indicator of the plurality of status indicators is part of a corresponding individual circuit including the corresponding status indicator, the corresponding individual segment, and the voltage regulator.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

Figure 1:
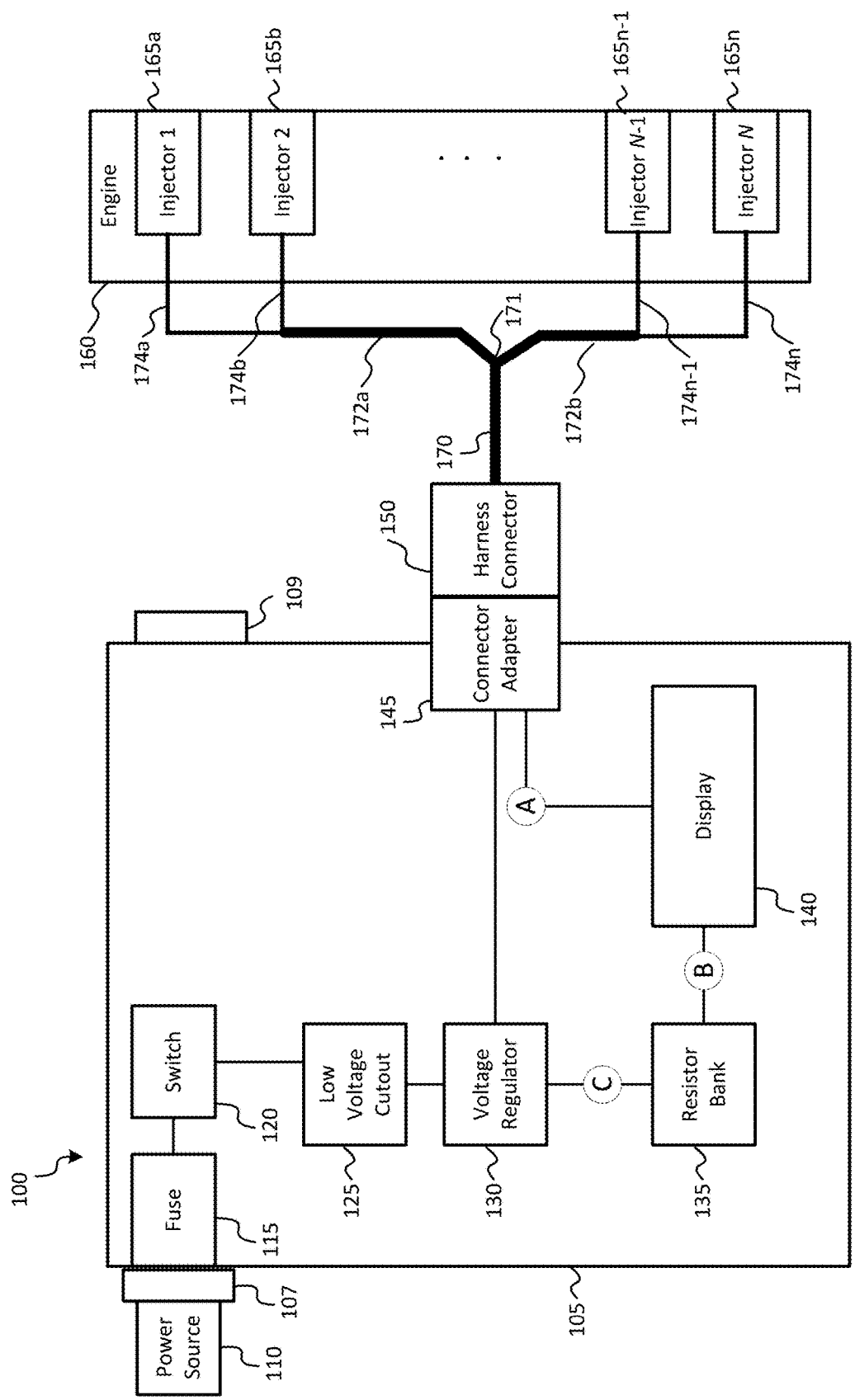
FIG. 1 is a block diagram of an exemplary engine harness tester configured with functionality for determining the integrity of an engine harness in accordance with embodiments of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE INVENTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. Pursuant to Section 904 of the Manual of Patent Examination Procedure, the Examiner, after having obtained a thorough understanding of the invention disclosed and claimed in the nonprovisional application has searched the prior art as disclosed in patents and other published documents, i.e., nonpatent literature. Therefore, as evidenced by the issuance of this patent, the prior art fails to disclose or teach the elements and limitations presented in the claims as enabled by the specification and drawings, such that the presented claims are patentable under 35 U.S.C. §§ 101, 102, 103, and 112.

Various embodiments of the present disclosure are directed to systems, devices, and methods that provide functionality for determining the integrity of an engine harness. In particular embodiments, an engine harness tester implemented in accordance with the present disclosure may be configured to test the integrity of the engine harness and may be able to determine the condition of each individual segment of the engine harness. The engine harness tester of embodiments may include a power source providing an input voltage to the engine harness tester, a voltage regulator configured to convert an input voltage to an operating voltage, which may be applied to individual circuits including the individual segments of the engine harness, and a display for displaying the condition of the engine harness. For example, the display of the engine harness tester of embodiments may include a plurality of status indicators, each status indicator of the plurality of status indicators configured to display a condition of a respective individual segment of the engine harness. A user may operate the engine harness tester to determine the condition of each individual segment of the engine harness being tested by simply activating the switch and reading the status indicator that corresponds to each individual segment to identify the condition of each individual segment.

FIG. 1 is a block diagram of an exemplary engine harness tester 100 configured with functionality for determining the integrity of an engine harness in accordance with embodiments of the present disclosure. As shown in FIG. 1, engine harness tester 100 may include functionality for testing the integrity of an engine harness, e.g., engine harness 170. As illustrated in the example shown in FIG. 1, engine harness 170 may be configured to operate in engine 160 and to carry electrical pulses to each injector of engine 160.

Engine 160 may include N injectors (e.g., injectors 165*a*-165*n*). During operation of engine 160, engine harness 170 may operate to carry pulses to each of the N injectors of engine 160. The number N of injectors of engine 160 may vary depending on the specification of engine 160, which currently may be any number between 6 and 16 but may be lower or greater. Indeed, the techniques disclosed herein for testing the engine harness may apply to engines with any number of N injectors. Engine harness 170 may be composed of a plurality of individual segments. The number of individual segments in the plurality of individual segments of engine harness 170 may depend on the number N of injectors in engine 160 in which engine harness 170 operates. This is because, as mentioned above, the function of engine harness 170 includes carrying electrical pulses to each of the N injectors of engine 160. As such, in this example, engine harness 170 may include N individual segments, where each of the N individual segments corresponds to one injector of the N injectors of engine 160. In this manner, each of the N individual segments of engine harness 170 may carry electrical pulses to a corresponding injector of the N injectors of engine 160. For example, individual segment 174*a* may carry electrical pulses to injector 160*a*, individual segment 174*b* may carry electrical pulses to injector 160*b*, individual segment 174*n*-1 may carry electrical pulses to injector 160*n*-1, and individual segment 174*n* may carry electrical pulses to injector 160*n*.

Engine harness 170 may be formed by including all N individual segments into a single structure (e.g., a single cable that is wrapped and/or insulated) encasing all N individual segments in a main body. Engine harness 170 may then disposed on the engine and routed such that, each individual segment may branch off the main body of engine harness 170 and may be routed to a respective or corresponding injector. For example, individual segment 174*b* may branch off the main body of engine harness 170 and may be routed to injector 165*b*. After individual segment 174*b* branches off the main body, the main body may include the rest of the individual segments but may not include individual segment 174b. As injector 165a may be the last injector in the bank of injectors, individual segment 174a, which may correspond to injector 165a may branch off the main body, but the main body may not include any other individual segments as injector 165a is the last injector.

In some embodiments, the N injectors of engine 160 may be divided into a left bank and a right bank, and in some embodiment, each bank may include half of the N injectors. For example, the left bank of engine 160 may include injectors 1–injector N/2, and the right bank of engine 160 may include injectors N/2+1–injector N. In some embodiments, the injectors in each bank may be numbered from 1–N/2, with a letter signifying the bank to which they belong. For example, the injectors of the right bank in the example illustrated in FIG. 1 may be numbered R1–RN/2, and the injectors of the left bank may be numbered L1–LN/2. In these embodiments, the main body of engine harness 170 may split at 171 into left section 172a, which may be configured to include the individual segments corresponding to the left bank injectors L1–LN/2 (e.g., injectors 1–injector N/2), and right section 172b, which may be configured to include the individual segments corresponding to the right bank injectors R1–RN/2 (e.g., injectors N/2+1–injector N).

Figure 2A:
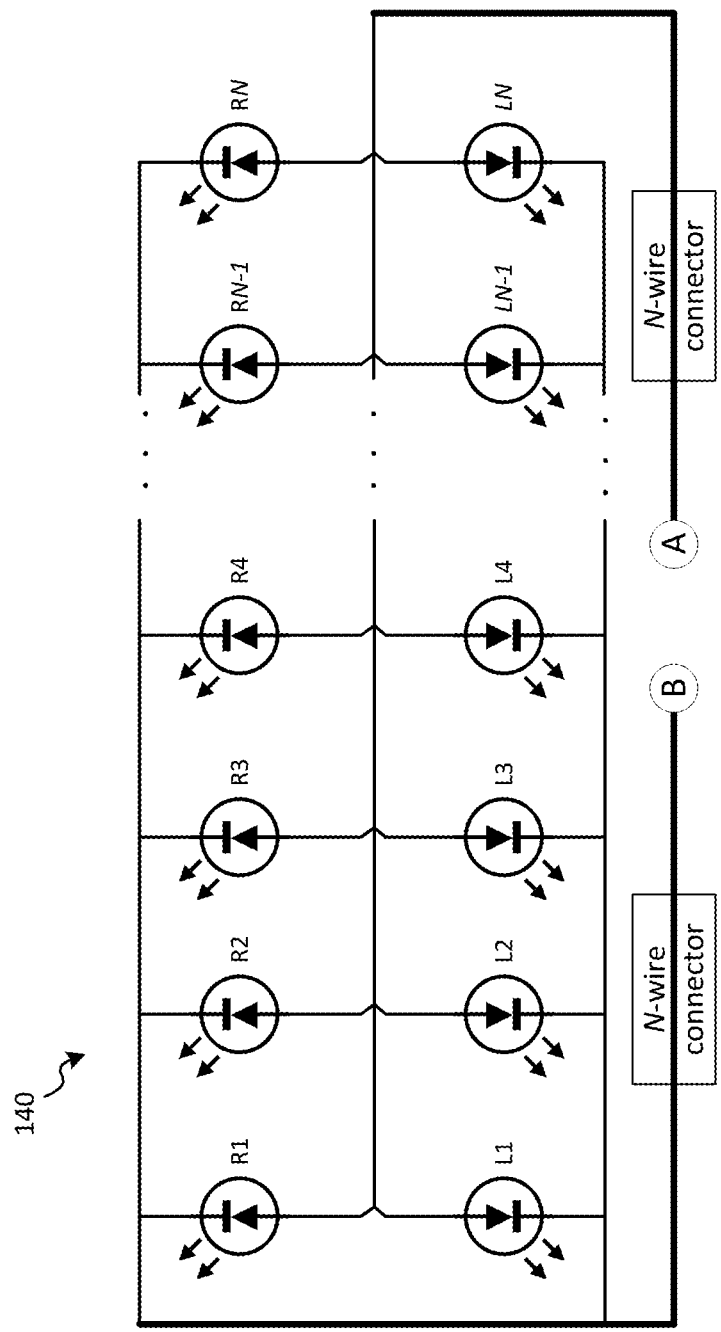
FIG. 2A is a diagram illustrating an example configuration of an engine harness tester display implemented in accordance with embodiments of the present disclosure.
Figure 2B:
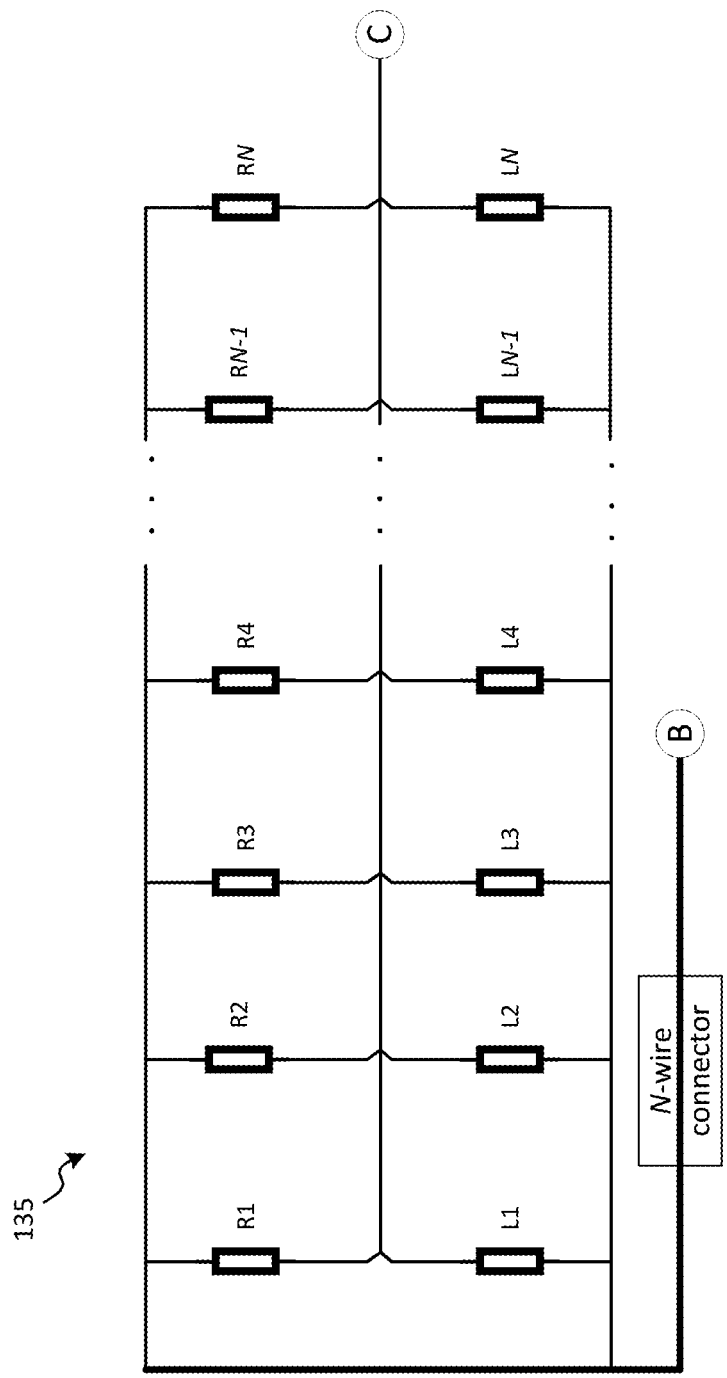
FIG. 2B is a diagram illustrating an example configuration of a resistor bank for an engine harness tester implemented in accordance with embodiments of the present disclosure.
Figure 3A:
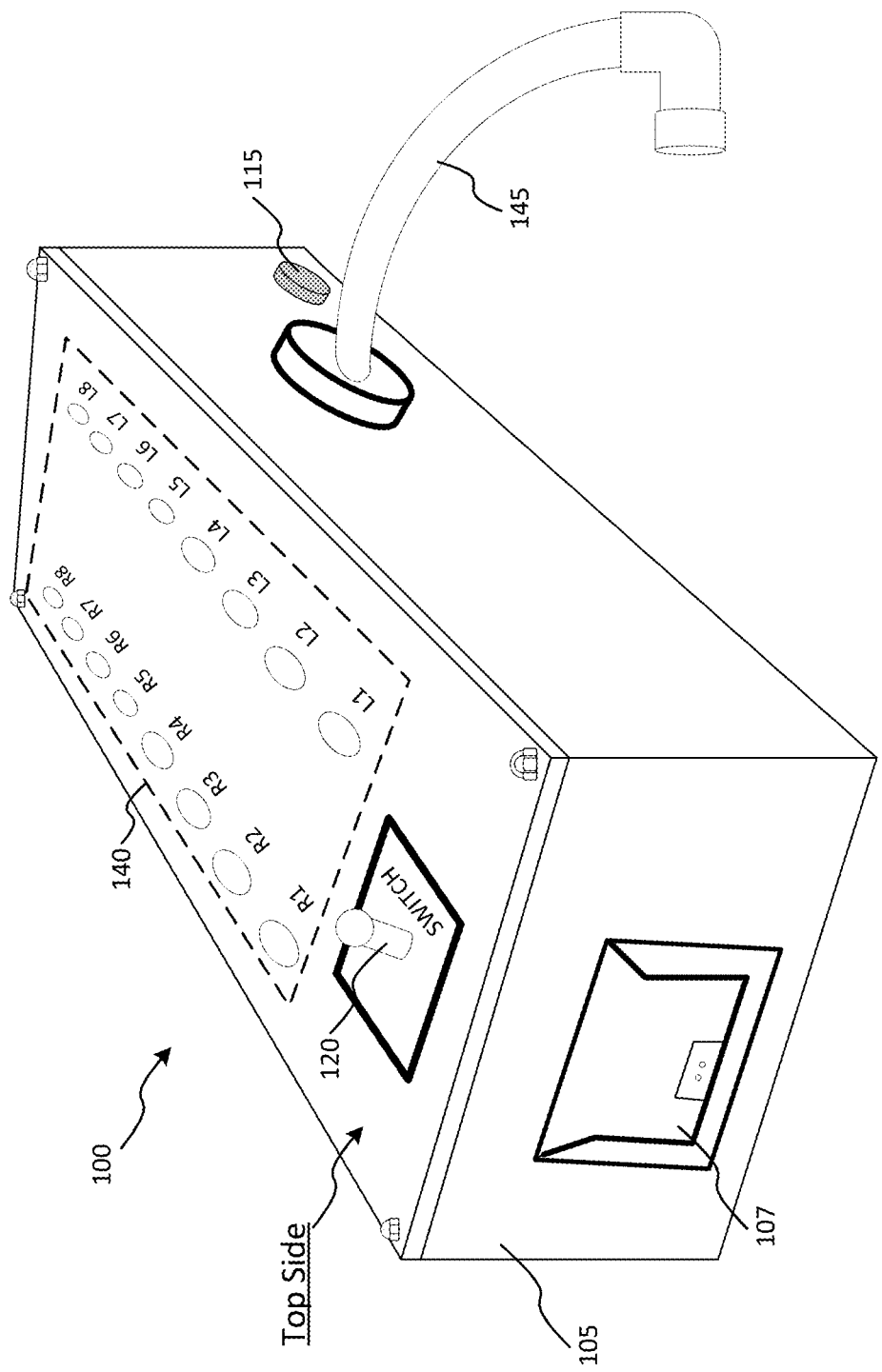
FIG. 3A is a diagram illustrating a perspective view of an engine harness tester configured in accordance with embodiments of the present disclosure.
Figure 3B:
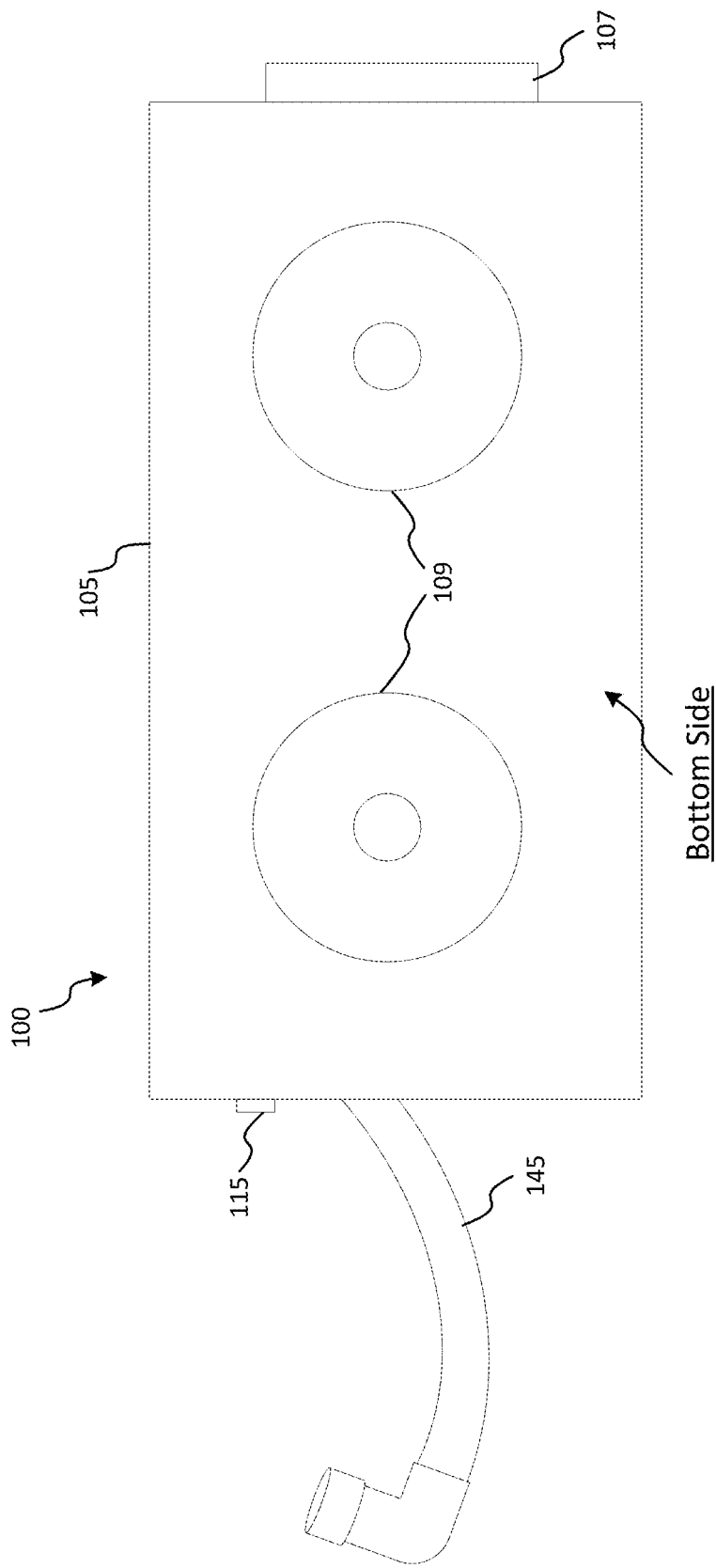
FIG. 3B is a diagram illustrating another perspective view of an engine harness tester configured in accordance with embodiments of the present disclosure.

Details of the functionality of the various components of engine harness tester will now be discussed. It is noted that the following discussion of engine harness tester 100 of FIG. 1 will be further based on the example illustrated in FIGS. 2A, 2B, 3A, and 3B. FIG. 2A is a diagram illustrating an example configuration of an engine harness tester display implemented in accordance with embodiments of the present disclosure. FIG. 2B is a diagram illustrating an example configuration of a resistor bank for an engine harness tester implemented in accordance with embodiments of the present disclosure. FIG. 3A is a diagram illustrating a perspective view of an engine harness tester configured in accordance with embodiments of the present disclosure. FIG. 3B is a diagram illustrating another perspective view of an engine harness tester configured in accordance with embodiments of the present disclosure.

As shown in FIG. 1, engine harness tester 100 may include housing 105, power source 110, fuse 115, switch 120, low voltage cutout 125, voltage regulator 130, resistor bank 135, display 140, and connector adaptor 145. These components, and their individual components, may cooperatively operate to provide functionality for testing the integrity of an engine harness in accordance with the discussion herein. For example, in operation according to embodiments, switch 120 may be operated to activate engine harness tester 100, which may cause an input voltage to be applied and converted to an operating voltage by voltage regulator 130. The operating voltage may be applied, via connector adapter 145, to engine harness 170 (e.g., via harness connector 150), which may route the operating voltage through each of the individual segments of engine harness 170 and the corresponding injectors, and back to the engine harness tester 100 through display 140 and resistor bank 135. In this manner, when engine harness tester 100 is connected to engine harness 170 for testing of engine harness 170, each individual segment of engine harness 170 may form an individual circuit, where an individual circuit for an individual segment may run from voltage regulator 130, through engine harness 170 to an injector corresponding to the individual segment, through the individual segment back to the display (e.g., through a status indicator corresponding to the individual segment), through resistor bank 135, and back to voltage regulator 130. In embodiments, the status indicator corresponding to the individual segment may indicate a condition of the individual segment. For example, where the condition of the individual segment is a faulty condition (e.g., where there is a break on the continuity of the individual circuit corresponding to the individual segment, or where the individual segment suffers from a high-resistance condition, or other problems), the status indicator corresponding to the individual segment may indicate the faulty condition (e.g., the status indicator may not illuminate, may display an indicator corresponding to a faulty condition (e.g., a color or message corresponding to the faulty condition), an audio signal corresponding to the faulty condition may be sounded or played, etc.). On the other hand, where the condition of the individual segment is a good condition (e.g., where there is no break on the continuity of the individual circuit corresponding to the individual segment), the status indicator corresponding to the individual segment may indicate the good condition (e.g., the status indicator may illuminate, may display an indicator corresponding to a good condition (e.g., a color or message corresponding to the good condition), an audio signal corresponding to the good condition may be sounded or played, etc.).

It is noted that the present discussion focuses on a particular application of an engine harness tester that involves testing a wiring harness of a locomotive engine. In addition, the present discussion focuses on wiring harness that carry electrical pulses to engine injectors. However, it should be appreciated that the techniques disclosed herein may also be applicable for testing other types of harness. For example, the techniques disclosed herein may also be applicable for testing harness for other types of engines, or for engines of other types of vehicles. Indeed, the techniques disclosed herein may be applicable for any wiring harness that is composed of segments and carries electrical pulses to other components. As such, the discussion herein with respect to testing a locomotive engine injectors harness should not be construed as limiting in any way.

It is noted that the functional blocks, and components thereof, of system 100 of embodiments of the present invention may be implemented using processors, electronics devices, hardware devices, electronics components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally, or alternatively, when implemented in software, one or more of the functional blocks, or some portion thereof, may comprise code segments operable upon a processor to provide logic for performing the functions described herein.

It is also noted that various components of system 100 are illustrated as single and separate components. However, it will be appreciated that each of the various illustrated components may be implemented as a single component (e.g., a single circuit, a single application, server module, etc.), may be functional components of a single component, or the functionality of these various components may be distributed over multiple devices/components. In such embodiments, the functionality of each respective component may be aggregated from the functionality of multiple modules residing in a single, or in multiple devices.

It is further noted that functionalities described with reference to each of the different functional blocks of system 100 described herein is provided for purposes of illustration, rather than by way of limitation and that functionalities described as being provided by different functional blocks may be combined into a single component or may be provided via computing resources disposed in a cloud-based environment accessible over a network.

Housing 105 may be configured to encase or hold the various components and circuitry of engine harness tester 100. In embodiments, housing 105 may be manufactured of a durable material, and may be machined or 3-D printed using readily available materials and/or techniques. As shown in FIG. 3A, housing 105 may resemble a box within which various component of engine harness tester 100 may be enclosed. Housing 105 may have a removable lid for accessing the interior components of engine harness tester 100. In embodiments, a top side of housing 105 may be configured to provide access to various components of engine harness tester 100. For example, switch 120 and display 140 may be accessible, at least partially, on the top side of housing 105. In this manner, a user operating engine harness tester 100 may activate switch 120 to activate engine harness tester 100 and initiate the engine harness test. Display 140 may provide results of the engine harness test by providing an indication of the condition of the engine harness. Further details on the functionality of the various components of engine harness tester 100 will be discussed below.

In embodiments, connector adapter 145 may exit housing 105 through a side of housing 105 to facilitate connection of connector adapter 145 to the connector of the engine harness (e.g., harness connector 150 of engine harness 170). On another side, or in some embodiments on the same side, access to fuse 115 may be provided. For example, a holder for fuse 115 be installed such that access to the fuse holder may be provided from the outside of housing 105. In this manner, a user may install, remove, or replace fuse 115 without opening housing 105. In still another side, or in some embodiments on the same side, battery holder 107 may be disposed on housing 105 and may be accessible externally. In this manner, installing, removing, or replacing a battery may be performed without opening housing 105.

In some embodiments, housing 105 may include battery holder 107. Battery holder 107 may be configured to provide a mechanism for connecting power source 110 to engine harness tester 100. In embodiments, battery holder 107 may be keyed or configured to accept a specific type of power source, such as an external battery, a power adapter, etc. In embodiments where power source 110 may be an external battery, battery holder 107 may be keyed to a particular type and/or style of external battery. In some embodiments, battery holder 107 may be removable to enable replacing battery holder 107 with another battery holder keyed to a different type and/or style of external source. In this manner, battery holder 107 may be configured to allow for engine harness tester 100 to operate with various and different types and/or styles of external batteries.

In embodiments, housing 105 may include holder 109. Holder 109 may include a mechanism for releasably engaging the body (e.g., a surface) of the locomotive engine whose engine harness is being tested (e.g., engine 160 in FIG. 1) to allow for hands-free operations by a user while the engine harness test is being conducted. Holder 109 may include any component or device configured to releasably attach housing 105 to a surface of the locomotive engine such that engine harness tester 100 may remain securely, but releasably, attached to the locomotive engine while engine harness tester 100 is manipulated to test the engine harness, and to allow for removal of engine harness tester 100 from the surface of the locomotive engine, such as by a user when the engine harness test is completed. In embodiments, holder 109 may be configured to releasably attach housing 105 to a surface of the locomotive engine while allowing display 140 and switch 120 to be accessible by the user so that the user may initiate the engine harness test and may perceive the results of the engine harness test. For example, as shown in FIG. 3B, holder 109 may include one or more magnets attached to the bottom side of housing 105. In this manner, the bottom side of housing 105 may be releasably attached to the surface of the locomotive engine, which may secure engine harness tester 100 to the surface of the locomotive engine while allowing the top side of housing 105, on where display 140 and switch 120 are disposed, to remain accessible to a user for hands-free operation (e.g., in a manner such that the user does not have to hold engine harness tester 100 while the engine harness test is being conducted).

Power source 110 may be configured to provide input power or voltage to the various components of engine harness tester 100 for operations. In embodiments, power source 110 may include a power adapter configured to connect to a typical electrical outlet and to condition the power from the electrical outlet for operation by engine harness tester 100. In alternative or additional embodiments, power source 110 may include an external battery. In these embodiments, the external battery may be an off-the-shelf, easy to obtain battery, which may allow for easy replacement of power source 110 as well as utilization of readily available battery chargers. In addition, use of an external battery may streamline the operation of engine harness tester 100 by simplifying troubleshooting as a user may eliminate a problem with power source 110 by simply replacing the external battery, rather than potentially having to troubleshoot yet another potentially complex component. Additionally, the use of an external, easy to replace battery may enable engine harness tester 100 to be portable and compact.

In embodiments, power source 110 may provide a direct current (DC) voltage, which may range from 9-20 volts. In some embodiments, power source 110 may provide an input voltage of 18 VDC to engine harness tester 100.

Fuse 115 may be configured to provide protection to the various components of engine harness tester 100. For example, fuse 115 may be configured to cutoff the input voltage from power source 110 when a high current spike condition is detected. In this case, fuse 115 may cutoff the path of the input power from power source 110 to prevent the high current spike from reaching other components of engine harness tester 100 and to prevent damage. In embodiments, fuse 115 may be operable connected between power source 110 and switch 120.

Switch 120 may be configured activate or turn on engine harness tester 100. For example, switch 120, upon activation, may enable power to flow through the various components of engine harness tester 100. In embodiments, activation of switch 120 may also initiate testing of the engine harness connected to connector 145 (e.g., engine harness 170). As noted above, switch 120 may be accessible to a user externally (e.g., external to housing 105 of engine harness tester 100). In embodiments, switch 120 may include a single throw switch for simplifying operations of engine harness tester 100. In this manner, engine harness tester 100 may be configured as an easy-to-use device. For example, engine harness tester 100 may be activated and the engine harness test may be initiated by activation of a single switch, in which case the user may not have to fumble through complicated testing procedures.

Connector adapter 145 may be configured to provide a mechanism to connect the engine harness to be tested (e.g., engine harness 170) to engine harness tester 100. In embodiments, connector adapter may include a removable adapter, which may allow for connecting different types of harness connectors to engine harness tester 100. For example, a first removable adapter may be configured for a first type of harness connector, and a second removable adapter maybe configured for a second type of harness connector. In this example, engine harness tester 100 may be used to test the first and second harnesses with different connectors by installing the appropriate connector adapter to connector adapter 145. In embodiments, the inside facing end of connector adapter 145 (e.g., the end connecting to components of engine harness tester 100) may include multiple sections for connecting to different components of engine harness tester 100. Each of the multiple sections may connect to corresponding connections on the outside facing side of connector adapter 145. For example, a first section of connector adapter 145 may be configured to connect to voltage regulator 130 in order to connect (e.g., via the outside facing side of connector adapter 145) engine harness 170 to the operating voltage provided by voltage regulator 130 so that engine harness 170 may carry the operating voltage through the individual segments of engine harness 170 to the respective injectors. In the same example, a second section of connector adapter 145 may be configured to connect (e.g., at point A via an N-wire connector not shown) to display 140 in order to connect (e.g., via the outside facing side of connector adapter 145) each individual segment of engine harness 170 to the corresponding status indicator to display the condition of each individual segment.

Display 140 may be configured to present results of the engine harness test. In embodiments, display 140 may include a plurality of status indicators, where each status indicator may be configured to display a condition of a corresponding individual segment of harness 170. For example, as shown in FIG. 2A, display 140 may comprise N status indicators, and each of the N status indicators may correspond to one of the N individual segments of engine harness 170. In addition, the N status indicators may be separated based on the injector bank to which the individual segment corresponding to the status indicators belongs. For example, indicator L1 may correspond to individual segment 174a (e.g., corresponding to injector 165a) on left section 172a operating in the left bank of engine 160, and may be configured to display a condition of individual segment 174a. In this case, status indicator L1 may be connected (e.g., via the corresponding wire of the N-wire connector) to individual segment 174a via connector adapter 145. In a similar manner, indicator RN may correspond to individual segment 174n (e.g., corresponding to injector 165n) on right section 172b operating in the right bank of engine 160, and may be configured to display a condition of individual segment 174n. In this case, status indicator R1 of display 140 may be connected (e.g., via the corresponding wire of the N-wire connector) to individual segment 174n via connector adapter 145.

In embodiments, the plurality of status indicators may include a plurality of light emitting diodes (LEDs), each LED of the plurality of LEDs configured as a status indicator for a corresponding individual segment of engine harness 170. In these embodiments, a status indicator may indicate a faulty condition of the corresponding individual segment of engine harness 170 by failing to illuminate, illuminating dimly relative to a full illumination of the status indicator, and/or by displaying a color indicating a faulty condition (e.g., illuminating with a red color). In embodiments, a status indicator may indicate a good working condition of the corresponding individual segment of engine harness 170 by illuminating, illuminating to above a threshold, and/or by displaying a color indicating a good working condition (e.g., illuminating with a green color).

In embodiments, a status indicator may include an audio feedback signal indicating the condition of the corresponding individual segment. For example, a faulty condition may be indicated with a particular sound or audio message, e.g., a particular tone, beep, voice message, etc., indicating the faulty condition. In some cases, a good working condition may be indicated with a particular sound or audio message, e.g., a particular tone, beep, voice message, etc., indicating the good working condition.

In embodiments, as noted above, each status indicator of display 140 may be part of an individual circuit formed when an engine harness to be tested (e.g., engine harness 170) is connected to engine harness tester 100. As will be described in more detail below, an individual circuit may run through voltage regulator 130, connector adapter 145, an individual segment corresponding to the individual circuit of the engine harness being tested, through the injector corresponding to the individual segment, back through individual segment and connector adapter 145 to the status indicator of display 140 configured to display the condition of the individual segment, and then through resistor bank 135 back to voltage regulator 130.

Resistor bank 135 may be configured to provide pull down resistance to each individual status indicator of display 140 in order to prevent burning out of the individual status indicators. In embodiments, resistor bank 135 may be operably disposed between display 140 and voltage regulator 130. In this manner, resistor bank 135 may be operably connected to voltage regulator 130 (e.g., at point C), and operably connected to display bank 140 (e.g., at point B via an N-wire connector). In embodiments, resistor bank may include a plurality of resistors, each resistor configured to provide pull down resistance to a corresponding status indicator of display 140. For example, as shown in FIG. 2B, resistor bank 135 may include N resistors. One end of each resistor may be connected to a common ground (e.g., which may be connected to the negative terminal of voltage regulator 130), while the other end of each resistor may be individually and separably connected (e.g., via a wire of an N-wire connector) to a corresponding status indicator. As noted above, each resistor provides resistance to a corresponding status indicator (e.g., provides resistance to the individual circuit including the corresponding status indicator) in order to prevent the status indicator from burning out.

Low voltage cutout 125, as shown in FIG. 1, may be configured to prevent over-discharging of power source 110 below a predetermined threshold. For example, low voltage cutout 125 may be configured with a predetermine threshold, which may be indicated as a voltage value. During operations of engine harness tester 100, low voltage cutout 125 may disconnect power source 110 from the other components of engine harness tester 100 when the input voltage provided by power source 110 drops below the predetermined threshold to prevent further draining of power source 110. When the input voltage provided by power source 110 increases to a voltage equal to or above the predetermined threshold, low voltage cutout 125 may connect power source 110 to the other components of engine harness tester 100. In embodiments, the functionality of low voltage cutout 125 prevent over-discharge of power source 110 may serve to prevent damage to power source 110 due to over-discharging. In embodiments, the predetermined threshold may be an absolute value or may be specified as a percentage of the voltage rating of power source 110. For example, power source 110 may provide an input voltage of 18 VDC to engine harness tester 100. In this example, the predetermined threshold may be set to 16.5 VDC, in which case, low voltage cutout 125 may disconnect power source 110 from the other components of engine harness tester 100 when the input voltage of power source 110 drops below 16.5 VDC. When the input voltage provided by power source 110 increases to a voltage equal to or above 16.5 VDC (e.g., because power source 110 has been recharged or replaced), low voltage cutout 125 may connect power source 110 to the other components of engine harness tester 100.

Voltage regulator 130 may be configured to convert the input voltage provided by power source 110 to an operating voltage that may be used by other components of engine harness tester 100, as well as to regulate the operating voltage to a constant value. In embodiments, the input voltage supplied by power source 110 may not be constant and may vary significantly. Voltage regulator 130 may be configured to provide an operating voltage that may vary with a small, acceptable, variance. In this manner, the operating voltage output by voltage regulator is constant within an acceptable tolerance.

In embodiments, the operating voltage output from voltage regulator 130 may be applied to the individual segments of the engine harness being tested, such as via connector adapter 145, and routed to display 140 and then through resistor bank 135 back to voltage regulator 130. If circuit continuity through an individual segment of the engine harness is good, display 140 may display an indication of the good working condition. Otherwise, if the circuit continuity through an individual segment of the engine harness is faulty, display 140 may display an indication of the faulty condition.

In embodiments, voltage regulator 130 may include functionality for DC-DC conversion. For example, power source 110 may provide an input voltage of 18 VDC to engine harness tester 100. In this example, voltage regulator 130 may include functionality to convert the 18 VDC input voltage to an operating voltage that is lower than the 18 VDC input voltage. In some embodiments, the operating voltage may be a 12 VDC operating voltage, but may also be a lower operating voltage (e.g., 9 VDC) or a higher operating voltage (e.g., 14 VDC). Indeed, the operating voltage may be determined based on system requirements, such as operating conditions, heat generating conditions, etc. For example, in some embodiments, the amount of heat generated by the operations of engine harness tester 100 may be determined to be high and in this case, the operating voltage may be lower in order to reduce the amount of heat generated. On the other hand, the amount of heat generate may be manageable, but the availability of components (e.g., resistors of resistor bank 135 or status indicators of display 140) may be limited, in which case the operating voltage may be determined based on the operating characteristics of the available components, which may not be able to operate at 12 VDC, or some other operating voltage.

Figure 4:
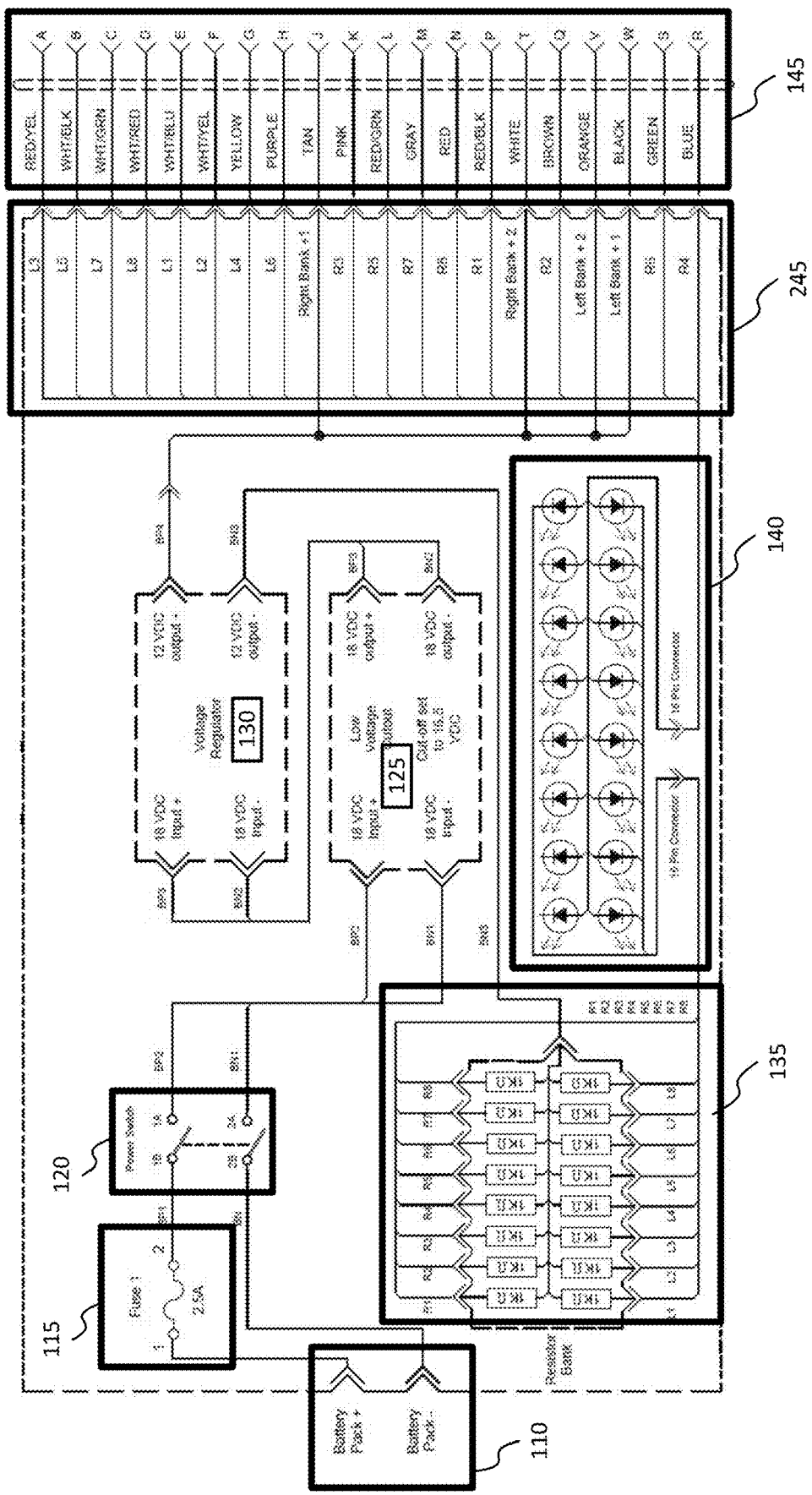
FIG. 4 shows an example of a circuit diagram implementing functionality of an engine harness tester according to embodiments of the present disclosure.

Operation of an engine harness tester (e.g., engine harness tester 100 of FIG. 1) will now be discussed with reference to the circuit diagram illustrated in FIG. 4. FIG. 4 shows an example of a circuit diagram implementing functionality of an engine harness tester according to embodiments of the present disclosure. It is noted that the example illustrated in FIG. 4 shows an engine harness tester configured for testing an engine harness having sixteen individual segments, each individual segment electrically coupled to one of sixteen injectors of a locomotive engine. However, this is merely for illustrative purposes and not intended to be limiting in any way. Indeed, as mentioned above, the techniques disclosed herein may be applicable to other engine configurations, such as configurations with 8, 12, 14, 20, etc., injectors.

During operation of the engine harness tester illustrated in FIG. 4 (e.g., harness tester 100 of FIG. 1), a user may connect power source 110 to the engine harness tester. In embodiments, power source 110 may be an external battery pack that may be installed onto an externally accessible battery holder disposed on the housing of the engine harness tester. Power source 110 may be configured to provide an input power to the engine harness tester. In the example illustrated in FIG. 4, the input voltage may be 18 VDC.

A user may connect an engine harness to be tested to the engine harness tester by connecting a harness connector of the engine harness to connector adapter 145. As shown, the inside-facing side of connector adapter 145 may be configured to connect to various components of the engine harness tester. In particular, a first section of the inside-facing side of connector adapter 145 (e.g., right bank+1, right bank+2, left bank+1, and left bank+2) may be electrically coupled to the positive output of voltage regulator 130. This first section of connector adapter 145 may be configured to electrically couple the positive output of voltage regulator 130 to a positive channel to be carried, through the engine harness, to each injector of the locomotive engine on which the engine harness is or is to be installed. In this manner, the positive output of voltage regulator 130 may be operably coupled to a positive terminal of each injector of the locomotive engine through the engine harness being tested.

As also shown, a second section of the inside-facing side of connector adapter 145 may be connected to display 140. For example, the second section may include a plurality of paths (e.g., R1-R8 and L1-L8) where each path connects to the positive side of a corresponding status indicator of display 140, which in this example may include sixteen LEDs. For example, the R1 path may connect to the positive terminal of LED R1, the R2 path may connect to the positive terminal of LED R2, and so on. Similarly, the L1 path may connect to the positive terminal of LED L1, the L2 path may connect to the positive terminal of LED L2, and so on. In embodiments, the second section may include a 16-wire connector 245 for electrically coupling to the positive terminal of each of the sixteen LEDs of display 140. On the other side of connector adapter 145, connector 145 may connect to the engine harness being tested. In particular, the positive terminal of each of the sixteen LEDs of display 140 may be electrically coupled to a corresponding one of the sixteen individual segments of the engine harness being tested, where each of the sixteen individual segments of the engine harness may be electrically coupled to the negative terminal of the corresponding injector via the engine harness. In this manner, the positive terminal of each LED is electrically coupled, through a corresponding individual segment, to a negative terminal of a corresponding injector of the locomotive engine.

As further shown, display 140 may be electrically coupled, via a 16-wire connector, to resistor bank 135. In particular, the negative terminal of each of the sixteen LEDs of display 140 may be electrically coupled to a terminal of a corresponding one of the sixteen resistors of resistor bank 135. The other terminal of each resistor of resistor bank 135 may be electrically coupled to the negative output of voltage regulator 130. In this manner, the negative terminal of each of the sixteen LEDs of display 140 may be electrically coupled to the negative output of voltage regulator 130 via a corresponding one of the sixteen resistors of resistor bank 135.

In this manner, an individual circuit may be formed for each of the sixteen segments of the engine harness being tested. Each individual circuit may include various components of the engine harness tester in series (including a corresponding individual segment and LED). For example, an individual circuit for the individual segment R1 of the engine harness being tested may run from the negative output of voltage regulator 130, through the first section of connector adapter 145 to the positive terminal of injector 1 (e.g., the injector corresponding or electrically coupled to individual segment R1), which may be in the right bank, from the negative terminal of injector 1 through the individual segment R1, through connector adapter 145 to the positive terminal of LED R1, which may correspond to individual segment R1, from the negative terminal of LED R1 to a first terminal of resistor R1, which may correspond to LED R1, from the second terminal of resistor R1 to the negative output terminal of voltage regulator 130, thereby closing the individual circuit for individual segment R1. A similar individual circuit may be formed for each of the sixteen individual segments of the engine harness being tested, with each circuit flowing through the corresponding components (e.g., R2 running through individual segment R2, LED R2, and resistor R2, L1 running through individual segment L1, LED L1, and resistor L1, etc.).

In embodiments, where the individual segment in a particular individual circuit is in good working condition, there would be good continuity on the individual circuit and current would flow through the circuit causing the LED within the individual circuit to illuminate. However, where the individual segment in a particular individual circuit is not in good working condition (e.g., it is defective, it is damaged, it is in a high-resistance condition, it is broken, etc.), there would not be good continuity on the individual circuit and current would not flow, or would flow with less current, through the circuit causing the LED within the individual circuit to either illuminate dimly or not to illuminate at all.

During operation of the engine harness tester illustrated in FIG. 4, the user may turn on the engine harness tester. For example, the user may activate switch 120, which may cause the input voltage (e.g., the 18 VDC) to be applied to low voltage cutout 125. In particular, power source 110 may be electrically coupled to low voltage cutout 125, through fuse 115 and switch 120. For example, a positive side of power source 110 may be electrically coupled, through fuse 115 and switch 120, to the positive input of low voltage cutout 125, and a negative side of power source 110 may be electrically coupled through switch 120, to the negative input of low voltage cutout 125. Activation of switch 120 may close the path through switch 120, which may cause the input voltage to be applied to low voltage cutout 125. In embodiments, fuse 115 may serve to break the path of the input voltage should a high current condition be present. In this case, fuse 115 may activate (e.g., may break the path) and may prevent the high current condition from affecting other components.

Low voltage cutout 125 may operate to monitor the input voltage provided by power source 110, which should be 18 VDC, and as long as the input voltage provided by power source 110 is above a predetermined threshold, the input voltage is pass through to the input of voltage regulator 130. In the case where the input voltage provided by power source 110 is not above the predetermined threshold, low voltage cutout 125 may disconnect the power source from the other components of the engine harness tester and may prevent the input power from passing through to voltage regulator 130. For example, low voltage cutout 125 may be configured with a predetermined threshold of 16.5 VDC. In this example, low voltage cutout 125 may monitor the 18 VDC input voltage and, as long as the input voltage remains above 16.5 VDC, the input voltage may be pass through to voltage regulator 130. However, upon detecting that the 18 VDC input voltage is not above 16.5 VDC, low voltage cutout 125 may disconnect power source 110 from voltage regulator 130 and in this case the input voltage may not be pass through to voltage regulator 130. of an engine harness tester configured in accordance with embodiments of the present disclosure During operation, the input voltage from power source 110 may be applied to voltage regulator 130 (e.g., pass through low voltage cutout 125). Voltage regulator 130 may convert the input voltage to a constant operating voltage. For example, voltage regulator 130 may convert the 18 VDC input to a 12 VDC operating voltage. In this manner, voltage regulator may perform a DC-DC step down conversion. Voltage regulator 130 may also ensure that the 12 VDC operating voltage is constant to within an acceptable tolerance. In this manner, the operating voltage may not vary to values outside of the tolerance ensuring that operation of the engine harness tester is predictable and as expected.

As described above, the positive output of voltage regulator 130 may be routed, via connector 145 and the engine harness being tested, to the positive terminal of each of the sixteen injectors of the locomotive engine to which the engine harness belongs. The negative output of voltage regulator 130 may be routed, via resistor bank 135, to the negative terminal of each of the sixteen LEDs of display 140.

In particular, the output of voltage regulator may be used to determine the continuity of a plurality of individual circuits (e.g., sixteen individual circuits), each of which is formed to include, in series, one of the sixteen individual segments of the engine harness being tested. As noted above, each individual circuit may run from the positive output of voltage regulator 130 to the positive terminal of a corresponding one of the sixteen injectors, via the engine harness, then from the negative terminal of the corresponding one of the sixteen injectors through the corresponding individual segment to the positive terminal of an LED, and then from the negative terminal of the LED through a corresponding resistor of resistor bank 135 back to the negative output terminal of voltage regulator 130. In this manner, current may flow through an LED within an individual circuit as long as there is good continuity within the individual circuit. If there is no continuity within the individual circuit, the LED within the individual circuit may not illuminate. Similarly, if there is continuity, but the individual circuit is suffering from a high-resistance condition, the LED within the individual circuit may fail to illuminate or may illuminate dimly, due to the smaller current flowing through the individual circuit than should be flowing.

During operation, the user may determine the integrity of the engine harness being tested by reading the status indicators of display 140. The engine harness may be determined to be in good working condition when all LEDs in display 140 are illuminated or are illuminated with a brightness above a threshold. However, where one or more LEDs are not illuminated, the engine harness may be determined to be defective. Moreover, the user may determine which individual segment of the engine harness is defective by identifying which LED is not illuminated or is illuminated dimly. For example, LED R5 may not illuminate, in which case the user may determine that the individual segment R5, which may go to injector 5 in the right bank of the engine is defective.

It is noted that a faulty component of the engine harness tester may also cause the individual circuit within which the faulty component is present to indicate a failure. For example, a faulty status indicator (e.g., a burnout LED) or a faulty resistor may cause the status indicator to not illuminate even when the individual segment within the individual circuit is in good working condition. In some embodiments, engine harness testers of embodiments may include a self-diagnostics mechanism to identify failures within an engine harness tester. In some embodiments, a fault indicator (not shown) may be included in engine harness tester that indicates when a faulty component of the engine harness tester is discovered. In some embodiments, a diagnostics adapter may be provided, which may connect to connector adapter 145 (instead of a harness connector) and may include a plurality of jumpers which may serve to close each individual circuit and to provide a closed path for current flow. In these embodiments, the diagnostics adapter may be connected to the engine harness adapter, instead of an engine harness, and each status indicator should indicate a good condition, as the jumpers close each individual circuit. Any indication of a faulty condition from any of the status indicators would indicate a fault in one of the components within that individual circuit.

Figure 5:
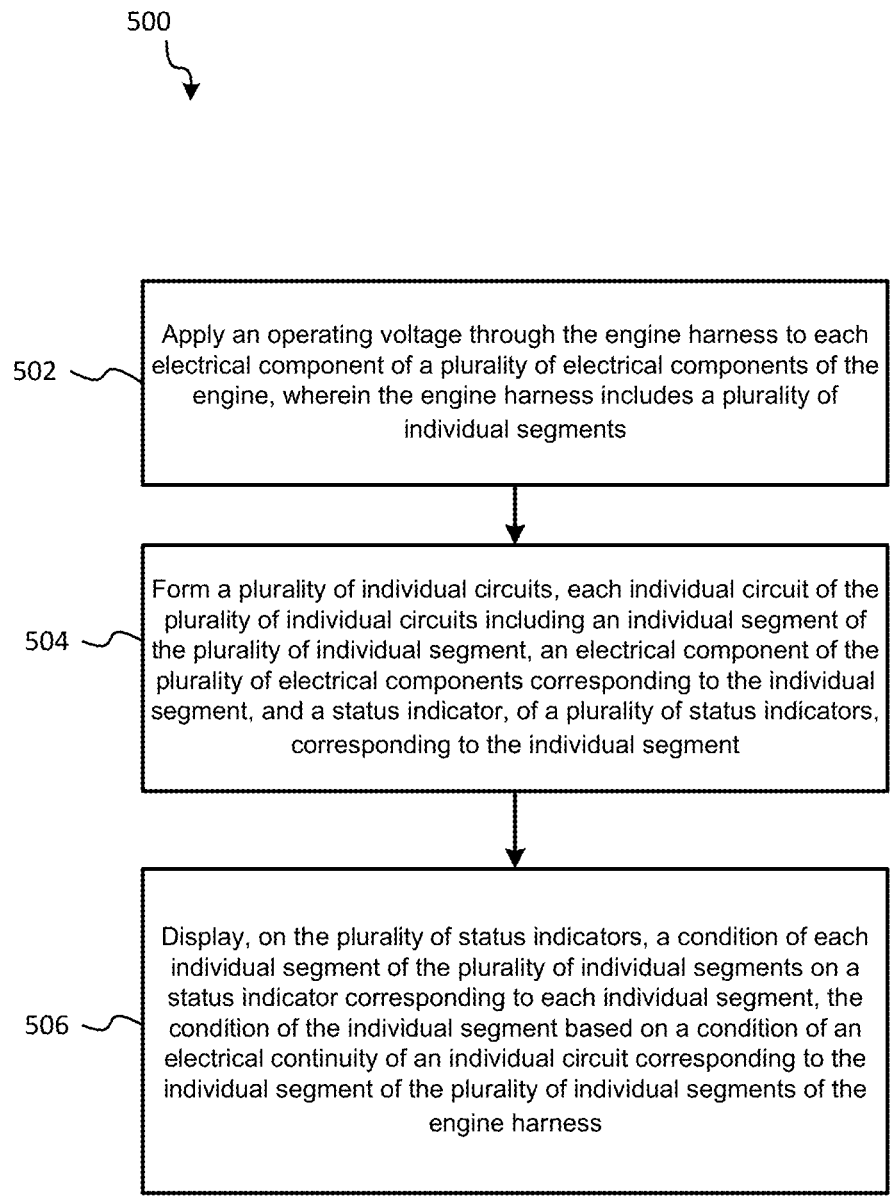
FIG. 5 shows a high-level flow diagram of operation of an engine harness tester configured in accordance with embodiments of the present disclosure for determining the integrity of an engine harness.

FIG. 5 shows a high-level flow diagram of operation for determining the integrity of an engine harness using an engine harness tester configured in accordance with embodiments of the present disclosure. For example, the functions illustrated in the example blocks shown in FIG. 5 may be performed using engine harness tester 100 of FIG. 1 according to embodiments herein.

At block 502, an operating voltage is applied through an engine harness to each electrical component of a plurality of electrical components of an engine. In embodiments, the engine harness may include a plurality of individual segments. In some embodiments, the application of an operating voltage through an engine harness may be performed by the cooperative operation of a voltage regulator (e.g., voltage regulator 130 in FIG. 1) and a connector adapter (e.g., connector adapter 145 in FIG. 1), as well as other components of an engine harness tester (e.g., engine harness tester 100 of FIG. 1). In embodiments, the voltage regulator and a connector adapter, as well as other components of the engine harness tester, may perform operations to apply an operating voltage through an engine harness to each electrical component of a plurality of electrical components of an engine according to operations and functionality as described above with reference to voltage regulator 130 and connector adapter 145, as well as other components of engine harness tester 100, and as illustrated in FIGS. 1-4.

At block 504, a plurality of individual circuits may be formed. In embodiments, each individual circuit of the plurality of individual circuits may include an individual segment of the plurality of individual segment, an electrical component of the plurality of electrical components corresponding to the individual segment, and a status indicator, of a plurality of status indicators, corresponding to the individual segment. In some embodiments, the formation of the plurality of individual circuits may be performed by the cooperative operation of components of an engine harness tester (e.g., engine harness tester 100 of FIG. 1), and according to operations and functionality as described above with reference to FIGS. 1-4.

At block 506, a condition of each individual segment of the plurality of individual segments is displayed on a status indicator, of the plurality of status indicators, corresponding to each individual segment. In embodiments, the condition of the individual segment may be based on a condition of an electrical continuity of an individual circuit corresponding to the individual segment of the plurality of individual segments of the engine harness. In some embodiments, displaying the condition of each individual segment of the plurality of individual segments on a status indicator, of the plurality of status indicators, corresponding to each individual segment may be performed by a display (e.g., display 140 in FIG. 1). In embodiments, the display may perform operations to display the condition of each individual segment of the plurality of individual segments on a status indicator, of the plurality of status indicators, corresponding to each individual segment according to operations and functionality as described above with reference to display 140 and as illustrated in FIGS. 1-4.

Persons skilled in the art will readily understand that advantages and objectives described above would not be possible without the particular combination of computer hardware and other structural components and mechanisms assembled in this inventive system and described herein. Additionally, the algorithms, methods, and processes disclosed herein improve and transform any general-purpose computer or processor disclosed in this specification and drawings into a special purpose computer programmed to perform the disclosed algorithms, methods, and processes to achieve the aforementioned functionality, advantages, and objectives. It will be further understood that a variety of programming tools, known to persons skilled in the art, are available for generating and implementing the features and operations described in the foregoing. Moreover, the particular choice of programming tool(s) may be governed by the specific objectives and constraints placed on the implementation selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various embodiments of the present disclosure may be combined or performed in ways other than those illustrated and described herein.

Functional blocks and modules in FIGS. 1-4 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An engine harness tester for testing the integrity of an engine harness of an engine, comprising:
    an external power source configured to provide an input voltage, wherein the external power source includes an external battery;
    a housing configured to enclose control circuitry including:
        a voltage regulator configured to:
            convert the input voltage from the external power source to a regulated operating voltage; and
            output the regulated operating voltage between a first terminal and a second terminal of the voltage regulator;

a connector adapter configured to:
    route the regulated operating voltage from the first terminal of the voltage regulator through the engine harness, wherein the engine harness includes a plurality of individual segments; and
    electrically couple each segment of the plurality of individual segments of the engine harness to a first terminal of a corresponding status indicator of a plurality of status indicators;
a display including the plurality of status indicators, each status indicator of the plurality of status indicators configured to display a condition of the corresponding individual segment of the plurality of individual segments of the engine harness, wherein a second terminal of each status indicator of the plurality of status indicators is connected to the second terminal of the voltage regulator such that each status indicator of the plurality of status indicators is part of a corresponding individual circuit including the corresponding status indicator, the corresponding individual segment, and the voltage regulator;
a battery holder disposed on an external surface of the housing and configured to:
    receive an external battery of a first type and an external battery of a second type, allow direct access to-the external battery for replacement without opening the housing, and
    receive the external battery of the second type by removing a first battery adapter configured to receive the external battery of the first type and replace the first battery adapter with a second battery adapter configured to receive the external battery of the second type; and
a self-diagnostic adapter comprising a plurality of jumpers, the self-diagnostic adapter configured to couple to the connector adapter and to provide an indication of a failure condition of the one or more of the plurality of status indicators.

2. The engine harness tester of claim 1, wherein the condition of the corresponding individual segment of the plurality of individual segments of the engine harness indicates the electrical continuity of the corresponding individual segment.

3. The engine harness tester of claim 2, wherein the plurality of status indicators includes a plurality of light emitting diodes (LEDs), and wherein displaying the condition of the corresponding individual segment of the plurality of individual segments of the engine harness includes:
    illuminating an LED when the electrical continuity of the corresponding individual segment is good; and
    failing to illuminate the LED when the electrical continuity of the corresponding individual segment is faulty.

4. The engine harness tester of claim 1, wherein the control circuitry further includes a low voltage cutout configured to:
    measure the input voltage;
    determine whether the input voltage is below a predetermined threshold;
    pass through the input voltage to the voltage regulator in response to a determination that the input voltage is equal to or above the predetermined threshold; and
    disconnect the external power source from the control circuitry of the engine harness tester in response to a determination that the input voltage is below the predetermined threshold.

5. The engine harness tester of claim 1, wherein the control circuitry further includes a resistor bank including a plurality of resistors, each resistor of the plurality of resistors connected to the second terminal of a corresponding status indicator of the plurality of status indicators and to the second terminal of the voltage regulator, wherein the second terminal of each status indicator of the plurality of status indicators is connected to the second terminal of the voltage regulator through a resistor corresponding to each status indicator.

6. The engine harness tester of claim 1, wherein the housing includes a holder operably coupled to the housing and configured to releasably engage a surface of the engine.

7. The engine harness tester of claim 6, wherein the holder includes one or more of:
    one or more magnets;
    an adhesive;
    one or more fasteners; and
    one or more hooks.

8. The engine harness tester of claim 1, wherein the connector adapter includes a removable adapter configured for a first type engine harness connector, and wherein the removable adapter is replaceable with a second removable adapter configured for a second type engine harness connector different from the first type of engine harness connector.

9. The engine harness tester of claim 1, wherein each individual segment of the plurality of individual segments of the engine harness is coupled to an injector of the engine.

10. A method of testing the integrity of an engine harness of an engine, comprising:
    applying an operating voltage through the engine harness to each electrical component of a plurality of electrical components of the engine, wherein the engine harness includes a plurality of individual segments, wherein the operating voltage is provided from an external battery through a battery holder disposed on an external surface of a housing and configured to allow direct access to the external battery for replacement without opening the housing, wherein the battery holder is configured to receive an external battery of a first type and an external battery of a second type, wherein receiving the external battery of the first type and the external battery of the second type incudes:
        removing a first battery adapter configured to receive the external battery of the first type; and
        replacing the first battery adapter with a second battery adapter configured to receive the external battery of a second type;
    forming a plurality of individual circuits, each individual circuit of the plurality of individual circuits including an individual segment of the plurality of individual segment, an electrical component of the plurality of electrical components corresponding to the individual segment, and a status indicator, of a plurality of status indicators, corresponding to the individual segment;
    displaying, on the plurality of status indicators, a condition of each individual segment of the plurality of individual segments on a status indicator corresponding to each individual segment, the condition of the individual segment based on a condition of an electrical continuity of an individual circuit corresponding to the individual segment of the plurality of individual segments of the engine harness; and
    providing, by a self-diagnostic adapter, an indication of a failure of one or more of the plurality of status indicators, wherein the self-diagnostic adapter comprises a plurality of jumpers and is configured to couple to the connector adapter.

11. The method of claim 10, wherein the plurality of status indicators includes a plurality of light emitting diodes (LEDs), and wherein displaying the condition of the individual segment includes:
  illuminating an LED when the electrical continuity of the individual segment is good; and
  failing to illuminate the LED when the electrical continuity of the individual segment is faulty.

12. The method of claim 10, further comprising:
  receiving an input voltage from an external power source;
  converting the input voltage from the external power source to the operating voltage; and
  regulating the operating voltage to within a tolerance.

13. The method of claim 12, further comprising:
  measuring the input voltage from the external power source;
  determining whether the input voltage is below a predetermined threshold;
  passing through the input voltage for conversion to the operating voltage in response to a determination that the input voltage is equal to or above the predetermined threshold; and
  disconnecting the external power source to prevent the input voltage from passing through for conversion to the operating voltage in response to a determination that the input voltage is below the predetermined threshold.

14. The method of claim 10, further comprising:
  encasing control circuitry for performing the applying, the forming, and the displaying within the housing.

15. The method of claim 14, wherein the housing includes a holder operably coupled to the housing and configured to releasably engage a surface of the engine.

16. The method of claim 15, wherein the holder includes one or more of:
  one or more magnets;
  an adhesive;
  one or more fasteners; and
  one or more hooks.

17. A device for testing the integrity of an engine harness of an engine, comprising:
  an external power source configured to provide an input voltage;
  a low voltage cutout configured to:
    pass through the input voltage to a voltage regulator when the input voltage is equal to or above the predetermined threshold; and
    disconnect the external power source from the voltage regulator when the input voltage is below the predetermined threshold;
  a voltage regulator configured to:
    convert the input voltage to a regulated operating voltage; and
    output the regulated operating voltage between a first terminal and a second terminal of the voltage regulator;
  a connector adapter configured to:
    route the regulated operating voltage from the first terminal of the volage regulator through the engine harness, wherein the engine harness includes a plurality of individual segments; and
    electrically couple each segment of the plurality of individual segments of the engine harness to a first terminal of a corresponding status indicator of a plurality of status indicators;
  a display including the plurality of status indicators, each status indicator of the plurality of status indicators configured to display a condition of the corresponding individual segment of the plurality of individual segments of the engine harness, wherein a second terminal of each status indicator of the plurality of status indicators is connected to the second terminal of the voltage regulator such that each status indicator of the plurality of status indicators is part of a corresponding individual circuit including the corresponding status indicator, the corresponding individual segment, and the voltage regulator;
  a battery holder disposed on an external surface of a housing and configured to:
    receive an external battery of a first type and an external battery of a second type,
    allow direct access to-the external battery for replacement without opening the housing,
    receive the external battery of the second type by removing a first battery adapter configured to receive the external battery of the first type and replacing the first battery adapter with a second battery adapter configured to receive the external battery of the second type; and
  a self-diagnostic adapter comprising a plurality of jumpers, the self-diagnostic adapter configured to couple to the connector adapter and to provide an indication of a failure of one or more of the plurality of status indicators.

\* \* \* \* \*